INVENTOR.
Roger M. Buckeridge
BY
Clarence F. Poole
ATTORNEY

March 18, 1952  R. M. BUCKERIDGE  2,589,220
BELT CONVEYER SYSTEM
Filed April 7, 1949  3 Sheets-Sheet 2
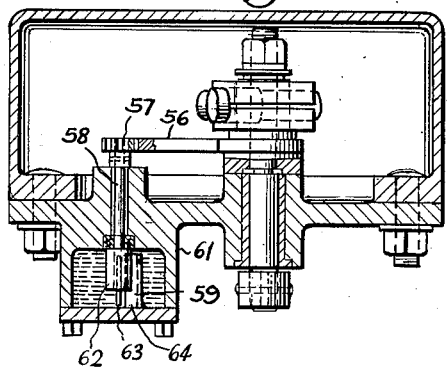
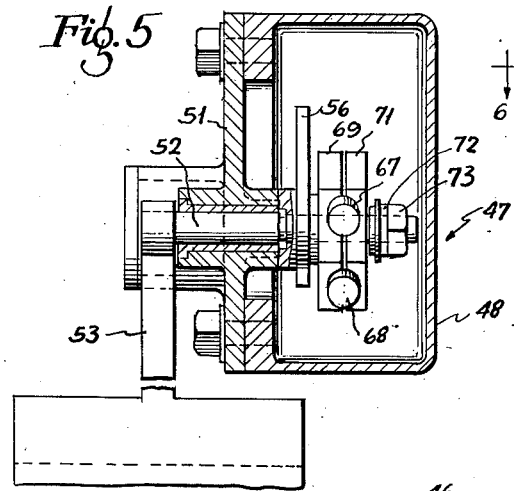
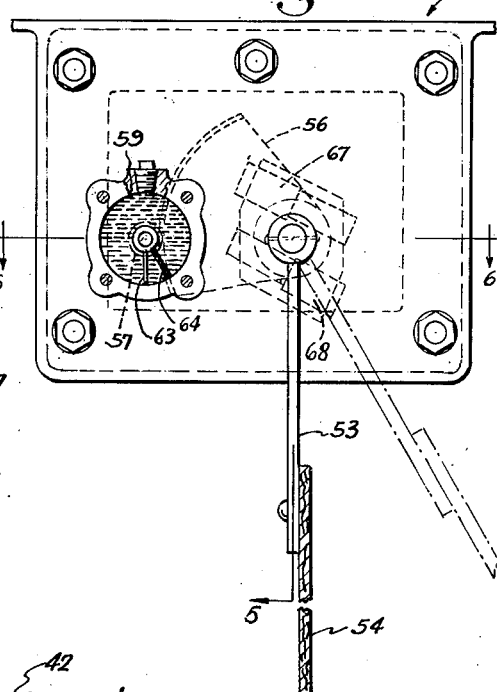
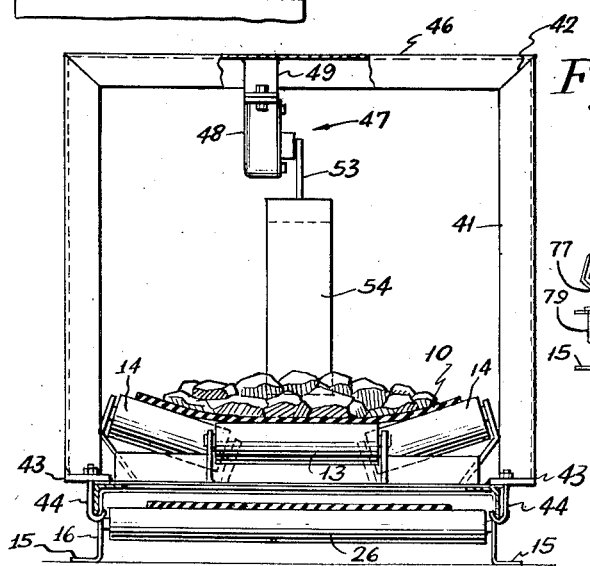
INVENTOR.
Roger M Buckeridge
BY
Clarence F. Poole
ATTORNEY March 18, 1952   R. M. BUCKERIDGE   2,589,220
BELT CONVEYER SYSTEM Filed April 7, 1949   3 Sheets-Sheet 3

INVENTOR.
Roger M. Buckeridge
BY
Clarence F. Poole
ATTORNEY

Patented Mar. 18, 1952

2,589,220

UNITED STATES PATENT OFFICE 2,589,220

BELT CONVEYER SYSTEM

Roger M. Buckeridge, Chicago, Ill., assignor to Goodman Manufacturing Company, Chicago, Ill., a corporation of Illinois Application April 7, 1949, Serial No. 86,079

18 Claims. (Cl. 198—82)

This invention relates generally to belt conveyor systems and particularly to electrical control systems for such belt conveyors.

Belt conveyor systems are commonly used in mines for the transport of minerals from the working faces to the portal or other parts of the mine. Such conveyors are generally sequentially arranged so that the inby belt discharges onto its adjacent outby belt, and may also be arranged so that a lateral conveyor belt discharges onto a main or gathering conveyor belt. The lateral conveyor belt may also consist of a number of conveyor belt units each sequentially arranged so that an inby belt conveyor unit discharges onto its adjacent outby unit until the last outby unit of such lateral conveyor discharges onto the main or gathering belt conveyor.

In order to reduce the current demand in starting such conveyor units, they are so arranged as to be started sequentially, that is, the outby unit is first started and then brought up to speed, whereupon by a suitable electrical connection from such an outby conveyor unit to its adjacent inby conveyor unit, the adjacent inby conveyor unit may then be started, thus reducing the amount of current which would be required if such conveyor units were started simultaneously. Such sequentially started conveyor units heretofore have not been provided with means for preventing operation or recycling of the starter control circuit when any belt failed to come up to proper running speed after going through the starting cycle. Without such provision for preventing operation or recycling of the starter control circuit of the conveyor unit, it was entirely possible to cause burning of the belt by the friction induced by the slipping contact of the drive roller with the conveyor belt. As a result, dangerous fires and explosions have occurred.

Such conveyor belt systems have also been arranged so that a lateral belt unit or a lateral system will discharge onto a main or gathering belt. When the main or gathering belt is loaded and the lateral belt units are discharging their contents onto such a main or gathering belt unit, an undesired amount of spillage may take place at the point of discharge from the lateral belt unit onto the main or gathering conveyor belt units.

With the foregoing considerations in mind it is an object of this invention to enable the outby unit of a belt conveyor system to be started before its adjacent inby unit in order to reduce the current demand which would be occasioned by the simultaneous starting of all conveyor belt units, and to prevent the recycling of the starter control circuit for such an outby belt if such belt is not brought up to proper running speed at the conclusion of the starting operation, and to prevent the operation of any inby belts.

A second and further object is to prevent the discharge by a lateral belt conveyor onto the main or gathering conveyor when both conveyor units are loaded.

Yet another object is to enable a lateral conveyor unit to be started as long as such lateral conveyor unit is not loaded at the transfer point, and to start such lateral conveyor unit irrespective of whether the main or gathering unit is in a loaded condition.

Still another object is to prevent the discharge by the lateral conveyor unit onto the main or gathering unit when the main or gathering unit is loaded with material at such point of transfer, and when such material is not being moved by the main conveyor because of the bridging of the material across the gathering conveyor belt.

A yet further object is to enable the starting circuit for an inby conveyor unit to cause the inby conveyor unit to continue to operate as long as the outby unit is running at proper speed and in the proper direction, but to prevent operation or recycling of the inby conveyor unit if the speed thereof should drop below a predetermined amount or stop, or if the direction should be reversed for any reason.

Other objects and important features of the invention will be apparent from the following description taken together with the drawings which illustrate a preferred embodiment which the invention may assume in practice, and what is now considered to be the best mode of practicing the invention.

In the drawings:

Figure 2 is a transverse sectional view through the main or gathering conveyor unit of Figure 1, showing a speed sensitive switch associated therewith;

Figure 3 is a transverse view through a portion of the gathering conveyor or the lateral conveyor of Figure 1, showing the mounting of the switch for indicating the load carried by such main or lateral conveyor;

Figure 4 is an enlarged end view of the switch shown in Figure 3, looking towards the left;

Figure 5 is a section taken along the line 5—5 of Figure 4, looking in the direction of the arrows;

Figure 6 is a section taken along the line 6—6 of Figure 4, looking in the direction of the arrows;

Figure 1:
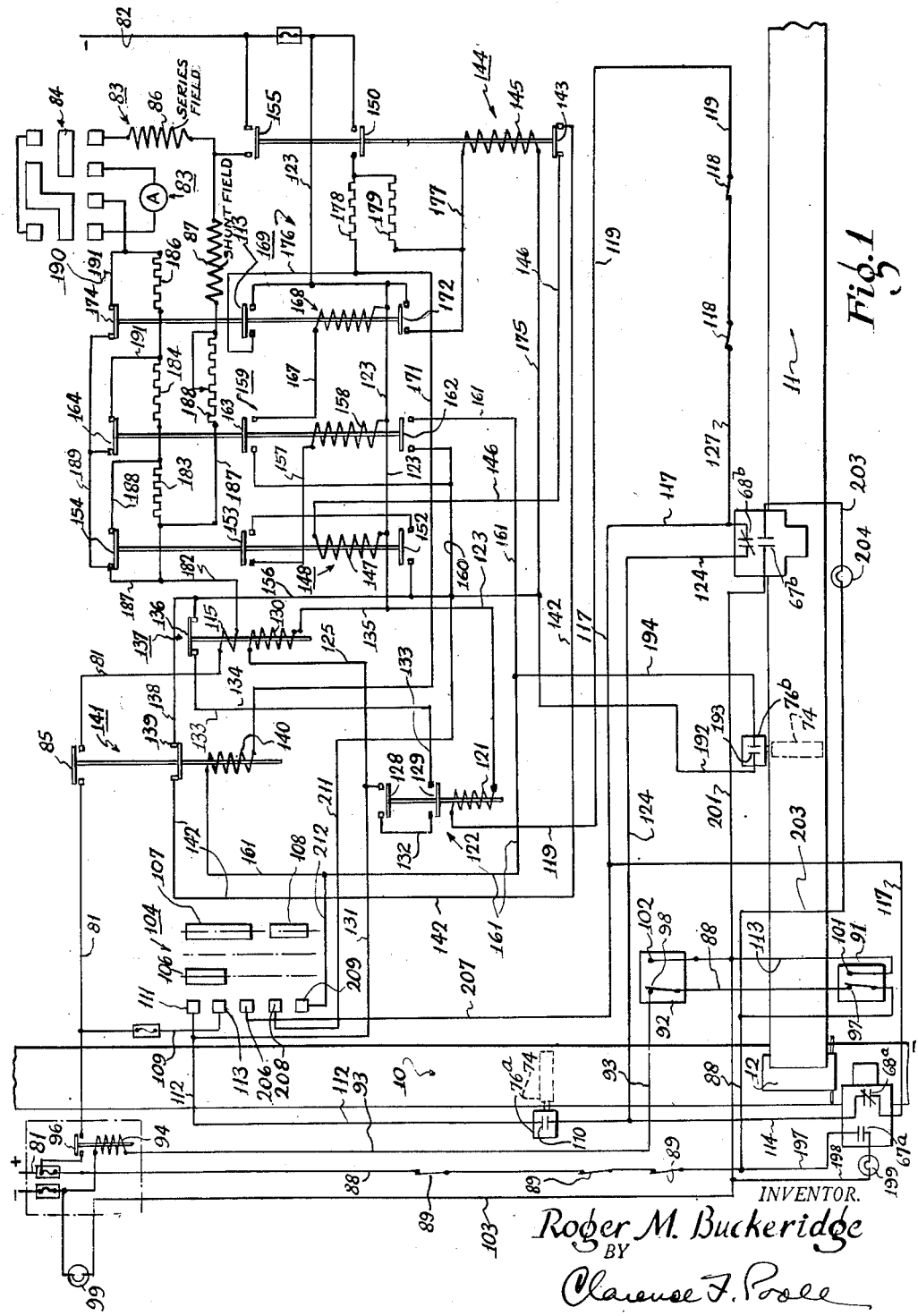
Figure 1 is a wiring diagram illustrating a belt conveyor system and a control system therefor according to the present invention.
Figure 7:
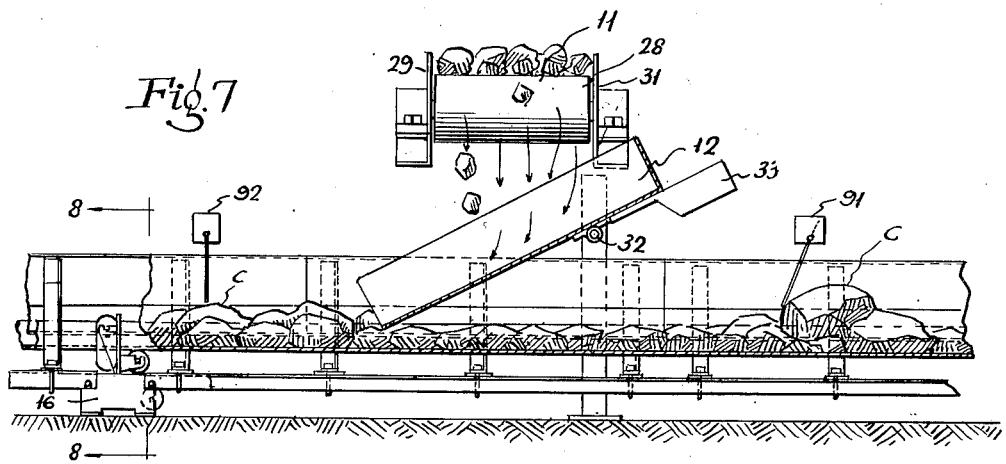
Figure 7 is a detailed elevation view of a portion of the gathering conveyor shown in Figure 1, at the point of discharge of the lateral or feeder conveyor onto the main conveyor.
Figure 8:
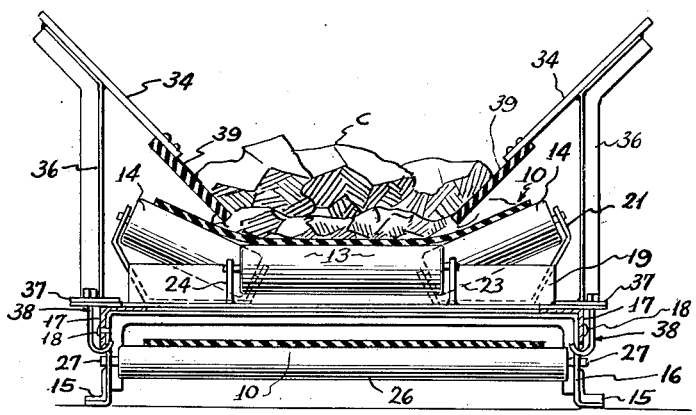
Figure 8 is a section taken along the line 8—8 of Figure 7, looking in the direction of the arrows.

Referring to Figure 1 of the drawings there is shown a main or gathering conveyor 10 which is arranged to receive the discharge from a lateral or feeder conveyor 11, such discharge taking place onto a discharge chute 12, see also Figures 7 and 8. The main conveyor belt 10 and the lateral conveyor belt 11 are moved by drive rollers (not shown) and the belts 10 and 11 are guided across horizontal idler rollers 13 and inclined idling guide rollers 14, see also Figure 3. The guide rollers 13 and 14 are mounted on spaced connector units 16 substantially in the shape of an inverted pan provided with feet 15 resting on the mine floor. The connector units 16 are connected together by angles 17 on each side of the connector unit 16, the angles 17 being slotted at each end, to engage buttons 18 held in the sides of the connector unit 16. The connector units 16 have welded thereto an angle 19, the vertical legs of which have welded thereto brackets 21 and 22 in which the inclined guide rollers 14 are journaled. The other sides of the vertical leg of the angle 19 are provided with similar brackets 23 and 24, which are welded thereto, and which have journaled therein the horizontal guide rollers 13 for the conveyor belts 10, 11. The connector unit 15 also supports an idling roller 26 for the return or slack side of the belt, 10, 11, the idling roller 26 being journaled at each end at 27 in the connector unit 15.

The angles 17, which are connected at each end by means of the buttons 18 in the connector unit 16 are connected together intermediate their ends to maintain the angles in spaced parallel arrangement, by means of angles, not shown, which are similar to the angles 19 of the connector unit 16. These angles also support the horizontal roller 13 and the inclined guide rollers 14 in a manner similar to that shown in Figure 8.

The lateral conveyor belt 11 which is arranged to discharge onto the main or gathering conveyor belt 10, see Figure 7, may be driven by a pulley 28 which is journaled in side supports 29 and 31, the end of the conveyor belt being raised to the position shown in Figure 7 above the main conveyor belt 10 and supported on the mine floor in any convenient fashion. The lateral conveyor belt 11 is arranged to discharge into the discharge chute 12 which is arranged to overlie the main conveyor belt 10. The discharge chute 12 is pivoted on an axis 32 and is provided with counterweights 33 so designed that when the lateral conveyor 11 is not discharging into the gathering conveyor 10, the discharge chute 12 will rock about the pivot 32 and away from the main or gathering conveyor 10.

The main or gathering conveyor 10 is provided with inclined sloping sides 34 at the point of discharge of the lateral conveyor onto the main conveyor, and for a short distance on either side thereof, to minimize spillage at such discharge point. The inclined sides 34 are held in place by a pair of supporting standards 36, preferably angle-shaped as shown, which are welded at their upper ends to the inclined sloping sides 34, and which are provided at their lower ends with bearing plates 37 which overlie the connector unit 16 and which have passing therethrough a hook bolt 38 to hook the standards 36 to the connector unit 16. Preferably, the inclined sloping sides 34 are provided at their lower ends with resilient material 39, such as rubber, which partly overlies the inclined portion of the conveyor belt 10.

Means are provided for indicating the loaded condition of the main conveyor belt 10 and the lateral conveyor belt 11, which means are connected in the starting control circuit for the main conveyor belt or the lateral conveyor belt, said means being operable in response to the average height of load carried by such belt and being also unresponsive to minor variations in such height of load as would be occasioned by large lumps of material interspersed throughout the length of such belt. As shown with particular reference to Figures 3 to 6, inclusive, the means for indicating the height of the load on such belt includes an inverted U-shaped standard 41, preferably consisting of angle members which are welded together as at 42 and which include end plates 43 overlying the connector angle 17 or the connector unit 16 as shown in Figures 7 and 8, and which have passing therethrough bolts 44 which engage the connector unit 16 or the depending leg of the angles 17.

Depending from a horizontal leg 46 of the inverted U-shaped standard 41 is a load indicating switch 47, which includes a casing 48 which is secured to the horizontal leg of an angle 49 welded to the horizontal leg of the inverted U-shaped standard 41. The switch 47 is provided with a closure 51 for the casing 48 which has journaled therein a shaft 52 which extends exteriorly thereof. The exterior end of the shaft 52 has fast thereto a depending arm 53 which has secured thereto a resilient load-sensitive finger 54, which is so arranged as to be moved with the depending arm 53 in a counterclockwise position to the dotted line position shown in Figure 4 when the belt 10 or 11 is loaded to a certain height and is transporting material. The resilient finger 54 is of such resiliency that it will permit large objects which are spaced along the belt to be transported without causing the depending arm 53 to be moved, as will now be described.

The end of the shaft 52 which protrudes into the casing 48 has mounted thereon a gear sector 56 which meshes with a pinion 57 mounted on a shaft 58 which extends into a chamber 59 of a dashpot 61 which is formed as a part of the closure 51 for the casing 48. The end of the shaft 58 which extends into the chamber 59 has mounted thereon a hub 62 which supports a movable vane 63 which contacts the inner cylindrical wall of the chamber 59. The inner cylindrical wall of the chamber 59 has extending radially therefrom a fixed vane 64 of such dimension as to provide a small amount of clearance as at 66 between the hub 62 and the fixed vane 64.

The portion of the shaft 52 which extends into the housing 48 supports a pair of mercury switches 67 and 68, see also Figure 1, which are held in position between a pair of recessed supporting plates 69 and 71, which are mounted on the shaft 52, and which clamp the mercury switches 67 and 68 into position, the clamping pressure being provided by means of a washer 72 and a nut 73 which is threaded to the end of the shaft 52, the nut 73 also serving to hold the gear sector 56 fast to the shaft 52. The mercury switches 67 and 68 are so arranged that the switch 67 is opened when the arm 53 is in the solid line position shown in Figure 4, the switch 68 being closed when the arm 53 is in the solid line position, and so that the switch 67 will be closed when the arm 53 has moved to the dotted line position seen in Figure 4, the switch 68 being open at that time.

It will be seen with particular reference to Figure 4 that the free swinging movement of the arm 53 is impeded by the resistance offered to the movement of the movable vane 63 in the dashpot 61, since the fluid in the dashpot can only move past the restriction afforded between the hub 62 and the fixed vane 64. It will thus be apparent that the resistance to the movement of the arm 53, afforded by the dashpot 61, will prevent the free swinging movement of the arm 53, at the same time permitting the resilient finger 54 to be displaced at irregular intervals by a large fragment of coal being transported by the belts 10 or 11. It will also be apparent that at such times the height of the load on the belt is such that the load carried thereby will tend to rock the shaft 52 in a counterclockwise direction, that such rocking of the shaft 52 can be achieved only by a continuous load on the belt 10 or 11 of such height and length that eventually the resilience of the finger 54 causes the arm 53 to move.

Referring now to Figure 2 of the drawings, means are provided for controlling the supply circuit to the belts 10 and 11 shown in Figure 1, said means being also employed to control the operation of the starter control circuit during the initial stages of the starting operation, similar and additional means being employed in connection with the inby belt to control the starting circuit associated therewith to prevent the recycling of its starting circuit if the inby belt 11 has not been brought up to proper operating speed. As shown in Figure 2, the belt 10, 11 is in contact with a roller 74 of a roller switch 76. The roller 74 and the roller switch 76 are supported on a pair of standards 77 which are connected to plates 78, which in turn rest on the angles 17 and are connected firmly thereto by means of hook bolts 79. The roller or speed responsive switch 76 is so arranged that when the roller 74 attains a certain speed in the proper direction, a pair of contacts in the switch 76 will close, the details of construction of the switch 76 being more clearly shown with reference to Wood Patent No. 2,510,165, issued June 6, 1950, for Electrical Control Systems.

Referring now to Figure 1 of the drawings, the control circuit for the main or gathering belt 10, which for convenience sake may be referred to in the claims as the outby conveyor unit, and for the lateral or feeding conveyor belt 11 which may for convenience sake be referred to in the claims as the inby conveyor, includes a supply line including main supply leads 81 and 82 for supplying power to a drive motor 83 for the lateral or feeder belt 11, the motor 83 being supplied with a conventional reverse drum 84 and having a series field 86 and a shunt field 87.

The supply of power to the motor 83 is additionally under the control of a branching conduit 88 including emergency switches 89 situated at convenient points in proximity to the main or gathering conveyor 10 and also includes a chute switch 91 mounted over the gathering conveyor belt 10 inby of the point of discharge of the lateral conveyor 11 onto the gathering conveyor 10, see also Figure 7. The branching conduit 88 also includes a chute switch 92 outby with respect to the point of discharge of the feeder belt 11 onto the main or gathering conveyor 10. The chute switches 91 and 92, connected in series with the branching conduit 88, are connected to the other side of the supply line through a branching conduit 93 and through a winding 94 of a main contactor 96 which controls the supply of power to the drive motor 83.

The chute switches 91 and 92, see also Figures 7 and 8, are so arranged that when fragments of coal C have crowded the gathering conveyor 10 at the point of discharge of the lateral conveyor 11 thereon so that it would be impossible for the lateral conveyor 11 to discharge without spilling onto the gathering conveyor 10 at such point of discharge, the circuit including the conductors 88 and 93 will be open, thus deenergizing the winding 94 and opening the supply circuit including the main supply leads 81 and 82 and also main supply circuit to belt 10. The chute switch 91 includes a contact 97 and the chute switch 92 includes a contact 98, which are closed when the gathering conveyor 10 is moving coal thereon and when the conveyor is not blocked at the point of transfer from the belt 11 to the belt 10.

The circuit including the conductor 88 includes a parallel circuit through the chute switches 91 and 92, so arranged that when either the contact 97 or 98 of the chute switches 91 and 92 is open, and contacts 101 or 102 closed, a signal lamp 99 will be lighted indicating to an operator that all belts have stopped because of a clogged chute. The chute switches 91 and 92 include contact points 101 and 102, which are connected to a lead 103 in circuit with the indicator lamp 99, contacts 101 or 102 closing upon the opening of either contact 97 or 98.

The starting of the feeder or lateral belt 11 is under the control of a main drum-type control cylinder 104 which includes a contact segment 106 for automatic operation and contact segments 107 and 108 for local operation when it is desired to operate the feeder belt 11 without regard to the condition of operation of the gathering belt 10. With the main control cylinder 104 in a position such that segment 106 is in contact with contact fingers 111 and 113, current is supplied through a lead 109 branching from the main supply lead 81 through contact fingers 111 and 113, and through contact 110 of roller switch 76a associated with the main belt 10 through a supply lead 112, see also Figure 2. It should be understood that the roller switch 76 of Figure 2 is identical in construction with the roller switch 76a of Figure 1. The roller switch 76a contains contact points 110 which are closed when the outby or gathering belt 10 is operating at proper speed and in the proper direction. The roller switch 76a is in circuit with a pair of parallel branching circuits which include load indicator switch 68a associated with the outby conveyor belt 10 which is normally closed when the belt 10 is not fully loaded, and a load indicator switch 68b associated with the inby or feeder belt 11, which is normally closed when the belt 11 is not fully loaded. The load indicator switches 68a and 68b are identical in construction with the load indicator switch disclosed in Figures 3, 4, 5, and 6. The circuits including the roller switch 76a and the load indicator switches 68a and 68b are so designed that power cannot be supplied to start the drive motor 83 for the inby or feeder belt 11 when both load indicator switches 68a and 68b are open, as when both the outby belt 10 and the feeder belt 11 are fully loaded, as explained with reference to Figures 3 to 6 inclusive.

Under the condition when the load indicator switch 68a of the belt 10 is closed, a circuit is completed through the contact points 110 of the roller switch 76a which includes a lead 114, contact points of the load indicator switch 68a, which in this condition will be closed, a lead 117, emergency switches 118, a lead 119, and a winding 121 of a control relay 122, the circuit being completed through a ground lead 123 to the other side of the supply line at conductor 82.

Under the condition when the gathering or outby conveyor 10 is loaded and the switch points of the load indicator switch 68a are opened, a circuit will be completed through the load indicator switch 68b associated with the inby or feeder belt 11, provided that the inby belt unit 11 is not loaded. Under this condition a circuit is made through the contact points 110 of the roller switch 76a through a lead 124 branching from the lead 114 through closed contact points of the load indicator switch 68b and thence through a lead 127, the circuit being completed through the emergency switches 118, the lead 119, and the relay 122, as before. It will be obvious also that the parallel circuits through load indicator switches 68a and 68b may both be completed when both the main belt 10 and the lateral belt 11 are not loaded.

The energization of the control relay 122 by the closing of either load indicator switch 68a or 68b, or both of the switches 68a and 68b, initiates a sequential operation of relays having time delay characteristics and which are connected to control the amount of resistance in series with the armature of the motor 83 for starting purposes. The relays controlling the amount of resistance in series with the armature are energized in cascade fashion substantially simultaneously, and so that full starting resistance will be in series with the armature during starting. These relays are arranged to be deenergized sequentially in the same order, the instant of deenergization of each being determined by the time delay characteristics of each, and operable to short out portions of the starting resistance in desired steps as the motor 83 comes up to speed.

When the control relay 122 is thus energized, a double set of contacts 128 and 129 will be closed, and a circuit will be made through a lead 131 branching from the lead 112, a jumper lead 132, a lead 133, through normally closed contact points 136 of an overload relay 137, thence through a lead 138, through contact points 139 of a relay 141, through a lead 142 to contactor points 143 of a relay 144. The circuit is then completed by means of a lead 146 through a winding 147 of a time delay relay 148, the circuit being then completed by the lead 123 to the other side of the supply line 82.

The overload relay 137 opens if an excessive amount of current flows through the armature of the drive motor 83. With the control cylinder 104 in the position previously described, current is supplied by means of a lead 125 branching from the lead 131, thence through a winding 130 of the overload relay 137 and thence by means of a lead 135 and the lead 123 to the supply line 82. The overload relay 137 includes a winding 115 which is connected in the positive lead 81 of the supply circuit to the drive motor 83. The winding 130 is so arranged that under normal operation of the motor it has insufficient pull to raise the contact 136, but under condition of overload of the motor 83 it does have sufficient pull to hold the relay in an open position after being first opened by coil 115.

With the relay 148 thus energized, contact points 152 and 153 associated therewith will close, at the same time opening contact 154. With the contacts 152 and 153 closed, a circuit will be made through the control relay 122 including the lead 133, the contacts 136 of the overload relay 137, a lead 156 branching from the lead 138, through contact points 152 and 153, and thence through a lead 157, to energize the winding 158 of a time delay relay 159, the circuit being completed to ground by the lead 123.

When the winding 158 of the relay 159 is thus energized, contact points 162, 163 associated therewith will close and contact points 164 will open. When the relay 159 is thus energized, current will be supplied by a lead 160 branching from the lead 156, through contact 163, through a lead 167 to energize the winding 168 of a time delay relay 169, the circuit being completed by the lead 123 to the supply line 82.

The energization of the relay 169 closes a pair of circuits through the windings of the relays 141 and 144, which circuits are designed to impress full line voltage across the starting resistance and motor 83. When the relay 169 is energized and the contacts 172 and 173 are closed, the closing of the contact 173 closes the circuit through a winding 140 of the relay 141, the circuit so closed including the lead 131, closed contacts 128 and 129, lead 133, closed contacts 136, lead 156, lead 160, contact 162, a lead 161, thence through the coil 140 of the relay 141, through lead 171, lead 176 branching therefrom, and through the contact 173 to the ground lead 123.

Another circuit is made on the closing of the contact 172. This circuit includes the lead 131, the contacts 128 and 129 of the control relay 122, the leads 133 and 134, contact 136 of the overload relay 137, lead 156, a conductor 175 branching from the lead 156, thence through a winding 145 of the relay 144 and thence through a lead 177 and the contact 172 to ground 123.

The relays 144 and 141 are thus energized and contact points 150, 85, and 155 thereof will close, at the same time opening contact 143, to provide an additional current path, which current path will become effective as will appear hereinafter. Thus, when the contact 150 is closed, a current path is made through the closed contacts of the control relay 122, through lead 133, closed contact 136, leads 156 and 160, closed contact 162 of the relay 159, lead 161, and thence through winding 140 of the relay 141, lead 171, and thence through a buffer resistor 179 to ground through the contactor 150.

At the same time, an additional circuit is made through the relay 144. The additional circuit so made is in parallel with the circuit through the closed contact 172 and includes a buffer resistor 179 connected in circuit with the lead 177, the closed contactor 150, and the negative side of the supply line 82.

The relays 148, 159, and 169 which have been energized in cascade fashion as described above, thereby open contacts 154, 164, and 174 associated respectively therewith. Upon energization of the relays 141 and 144, contacts 85 and 155 associated therewith will close, and full starting resistance will be placed in circuit with the motor 83. The circuit containing the full starting resistance includes lead 81, closed contact 85, series winding 115 of the overload relay 137, a lead 182 and resistances 183, 184, and 186 connected to the reversing drum 84 and series field 86 associated with the motor 83, the circuit being completed through closed contact 155 of the relay 144 to the main conductor 82.

A parallel circuit is also made for the shunt field 87 through a conductor 187 branching from the lead 182, an adjustable resistor 188 for the shunt field 87, the shunt field 87 and the closed contact 155.

The energization of the relays 144 and 141 opens the contact 143 of the relay 144 and contact 139 of relay 141 and opens the circuit through the winding 147 of the relay 148 and after a suitable time delay thereby closes the contact 154, which shunts out the resistance 183 by leads 187 and 188, thereby increasing the speed of the motor 83.

After relay 148 operates, several seconds after it is deenergized, the contacts 152 and 153 thereof are opened and the circuit through the winding 158 of the relay 159 will be opened. With the relay 159 thereby deenergized the contact 164 will close after another suitable time delay, thereby shunting out the resistance 184, the shunt circuit including leads 189 and 191. With the additional resistance 184 shunted out, the speed of the motor 83 will obviously be further increased.

Several seconds after the deenergization of the relay 159 the contact 163 opens and the winding 168 of the relay 169 is thereby deenergized. The operation of the relay 169 at the conclusion of the time delay period thereby closes the contactor 174 to short out the last resistance step 186, the shunt circuit including the lead 189 and a lead 190 to the reverse drum 84 and series field 86 of the motor 83.

The deenergization of the relay 169 would deenergize the relay 141 to open the contacts 85 and thus open the circuit to the motor 83. However, if the belt by this time has attained proper running speed, an additional circuit will have been made to keep the relay 141 energized to maintain the circuit to the motor 83. Thus the roller switch 76b is closed if the feeder belt 11 is at proper speed, and an additional circuit is made through the closed contacts 128 and 129 of the control relay 122, lead 133, closed contacts 136 of overload relay 137, lead 156 to lead 192, closed contacts 193, a lead 194 to the lead 161, and thence through the winding 140, and the lead 171 to the other side of the line through resistor 178 and the closed contact 150 of the relay 144.

If the belt 11 is not up to speed, the holding circuit through the relay 141 will not be maintained and the relay 141 will be thus deenergized, opening the contact 85 in the circuit with the motor 83.

Relay 144 will remain energized, however, because there has been no interruption in the circuit through its winding 145, and it will remain energized through its own contact 150. As long as it is energized, contact 143 will remain open and the starting cycle cannot be initiated since the starting circuit was originally initiated through contacts 139 and 143, hence the control will not recycle until the operator turns the control cylinder to the off position to open relay 144, so that contact 143 may be closed to initiate the starting cycle.

It will be apparent from the foregoing that there has been provided a novel circuit for controlling the starting of an inby or lateral belt which will not recycle if the lateral belt has not been brought up to proper speed.

In the event the load indicator switches 68a and 68b are opened, circuits are closed which indicate the loaded condition of the belts 10 or 11. Thus the load indicator switch 68a is provided with normally open contacts 67a connected in a lead 197 branching from the lead 88 and a lead 198 branching from the lead 103. The lead 198 has a signal lamp 199 connected therein which is adapted to light when the contacts 67a close, thus indicating the loaded condition of the belt 10. Similarly, the switch 68b is provided with contacts 68b connected in circuit with leads 201 and 203 and a signal lamp 204 adapted to light when the contacts 202 close, thus indicating the loaded condition of the belt 11.

When it is desired to operate the feeder belt 11 locally, irrespective of whether the main gathering belt 10 is operated or not, the controller 104 is moved to position whereby the contact segment 107 will contact points 111 and 113. The contact segment 107 in such position will also contact an additional contact point 206 which will short out the load indicator switch 68b through a lead 207 connected to the lead 117. The contact segment 108 is adapted to short out the roller switch 76b and to drive the motor 83 irrespective of whether the belt has been brought up to proper speed at the end of the cascade operation of the relays 148, 159 and 169 in the starting cycle. The contact segment 108 is adapted to contact the contact points 208 and 209 thereby making a shunting circuit directly to the relay 141 comprising a lead 211 connected from the lead 131 and a lead 212 to the lead 161 connected to the winding 140 of the relay 141. The control relay 122 will then be energized in cascade relationship as before to control the starting of the motor 83.

From the foregoing description it will be apparent that there has been provided a novel circuit for controlling the starting and operation of any belt of a conveyor belt system. The circuit according to the present invention prevents spilling at the transfer point of the inby belt to the outby belt. In the event either belt does not come up to proper speed recycling of the starting circuit will be prevented, thereby preventing the possibility of burning the conveyor belt which might be induced by slipping of the belt on the drive pulley. In the event the gathering belt is loaded too greatly at the point of transfer, the lateral or inby belt cannot be started, thereby making it impossible to overload the outby or main gathering belt, thereby avoiding spilling from the main or gathering belt.

While the invention has been described in terms of an embodiment which it may assume in practice, its scope is not intended to be limited in terms of the embodiment shown nor otherwise except by the appended claims.

I claim as my invention:

1. In an electrical control circuit for controlling the starting cycle of a motor driven inby unit of a conveyor system, a circuit including switch means operable in response to the speed of an outby unit of said conveyor system adapted to receive the discharge from said inby unit, a circuit for controlling the motor of said inby unit adapted to be energized upon operation of said first-named circuit, said second-named circuit including relays arranged in cascade relationship and having time delay characteristics for controlling the starting resistance of said motor, said relays being adapted to short out the amount of such resistance as said relays become deenergized, relay means operable to supply voltage to said motor during the starting operation and during normal running thereof, and a speed responsive switch operable in response to the proper speed of said inby unit for maintaining said last-named relay means in energized condition whereby said last-named relay means will continue to operate to supply voltage to said motor.

2. In an electrical control circuit for controlling the starting cycle of a motor driven inby unit of a conveyor system, a circuit operable in response to the speed of an outby unit of said conveyor system adapted to receive the discharge from said inby unit and to the load condition of either of said conveyor units, a circuit for controlling the motor of said inby unit adapted to be energized upon operation of said first-named circuit, said second-named circuit including relays arranged in cascade relationship and having time delay characteristics for controlling the starting resistance of said motor, said relays being adapted to short out the amount of such resistance as said relays become deenergized, relay means operable to supply voltage to said motor during the starting operation and during normal running thereof, and a switch operable in response to the proper speed of said inby unit for maintaining said relay means in energized condition whereby said last-named relay means will continue to operate to supply voltage to said motor when said inby unit has attained proper speed at the end of the starting cycle.

3. In an electrical control circuit for controlling the starting cycle of a motor driven inby unit of a conveyor system, a circuit operable in response to the speed of an outby unit adapted to receive the discharge from said inby unit and to the load condition of either of said conveyor units, a circuit for controlling the motor of said inby unit adapted to be energized upon operation of said first-named circuit, said second-named circuit including means for controlling the starting resistance of said motor, said means being adapted to short out the amount of such resistance as the speed of said motor increases, relay means operable to supply voltage to said motor during the starting operation and during normal running thereof, and a switch operable in response to the proper speed of said inby unit for maintaining said relay means in energized condition whereby said last-named relay means will continue to operate to supply voltage to said motor when said inby unit has attained proper speed at the end of the starting cycle.

4. In an electrical control system for controlling the starting cycle of a motor driven inby unit of a conveyor system, a switch operable in response to the speed of an outby unit of said conveyor system, a load indicating switch associated with each of said conveyor units, each of said load indicating switches being connected in series-parallel with said speed responsive switch and operable when said conveyor units are loaded below a predetermined amount, a control relay adapted to be energized by the operation of either of said load indicating switches and said speed responsive switch, a circuit energized upon energization of said control relay including means for controlling the amount of resistance in series with said motor during starting, said circuit including relay means operable to close a circuit through said motor during starting and normal running thereof, and a switch operable in response to the proper speed of said inby unit for maintaining said last-named relay means operable to maintain said last-named circuit closed.

5. In an electrical control system for controlling the starting cycle of a motor driven inby unit of a conveyor system, a switch operable in response to the speed of an outby unit of said conveyor system, a load indicating switch associated with each of said conveyor units, each of said load indicating switches being connected in series-parallel with said speed responsive switch and operable when said conveyor units are loaded below a predetermined amount, a control relay adapted to be energized by the operation of either of said load indicating switches and said speed responsive switch, a circuit energized upon energization of said control relay including means for controlling the amount of resistance in series with said motor during starting, said circuit including a pair of relays, one of said relays being connected in parallel with its associated relay and having a contact in series with its associated relay, said relays being operable to close a circuit through said motor during starting and normal running thereof, and a switch operable in response to the proper speed of said inby unit for maintaining said relays operable to maintain said last-named circuit closed.

6. In an electrical control system for controlling the starting cycle of a motor driven inby unit of a conveyor system, a switch operable in response to the speed of an outby unit of said conveyor system, a load indicating switch associated with each of said conveyor units, each of said load indicating switches being connected in series-parallel with said speed responsive switch and operable when said conveyor units are loaded below a predetermined amount, a control relay adapted to be energized by the operation of either of said load indicating switches and said speed responsive switch, a circuit energized upon energization of said control relay including time delay relays arranged in cascade relationship and adapted to short out the amount of starting resistance of said motor as said motor is brought up to speed in starting, said circuit including a pair of relays operable to close a circuit through said motor during starting and normal running thereof, one of said relays being connected in parallel with its associated relay, a circuit for energizing said pair of relays upon energization of said cascade arranged time delay relays, and a switch operable in response to the proper speed of said inby unit for maintaining said pair of relays operable to maintain the circuit through said motor in closed condition.

7. The invention as defined in claim 5 wherein said last-named relays will open the circuit through said motor if said inby unit is not operating at proper speed at the end of the starting period.

8. The invention as defined in claim 6 wherein one of said pair of relays will open the circuit through said motor if said inby unit is not operating at proper speed at the end of the starting period.

9. In an electrical control system for controlling the starting cycle of a motor driven inby unit of a conveyor system, a circuit including switch means operable in response to the speed of an outby unit of said conveyor system and operable also in accordance with the load condition of said inby unit and said outby unit, a control relay adapted to be energized upon operation of said switch means and said control relay including resistance controlling relays for said motor having time delay characteristics for controlling the starting resistance thereof, and being adapted to short out the amount of such starting resistance in accordance with the time delay characteristics of said relays, a circuit including a pair of relays operable to supply voltage to said motor during the starting operation and during the normal running thereof, both of said relays being adapted to be energized after said time delays, and a switch operable in response to the proper speed of said inby unit for maintaining said last-named relays in energized condition to supply voltage to said motor when the motor has attained proper speed at the end of the starting cycle, one of said pair of relays being adapted to prevent repeating of the starting cycle when said inby unit has failed to attain proper speed at the end of the starting cycle.

10. In an electrical control system for controlling the starting cycle of a motor driven inby unit of a conveyor system, a circuit including switch means operable in response to the speed of an outby conveyor unit adapted to receive the discharge from said inby unit, a circuit for controlling the motor of said inby unit adapted to be energized upon operation of said first-named circuit, said second-named circuit including relays arranged in cascade relationship and having time delay characteristics for controlling the starting resistance of said motor, said relays being adapted to short out the amount of such resistance as said relays become deenergized, a pair of relays adapted to be energized upon the closing of said second-named circuit, said last-named relays having windings connected in parallel, and having contacts in series with said resistance, one of said last-named relays being adapted to maintain the other of said relays in energized condition during said starting cycle, and a switch operable in response to the proper speed of said inby unit for maintaining the other of said relays in energized condition, to continue to supply voltage to said motor when the motor has attained proper speed at the end of the starting cycle.

11. The invention according to claim 6 wherein one of said last-named relays is adapted to be deenergized if said motor has not attained proper running speed at the end of said starting cycle, and open the supply circuit to said motor.

12. In a motor control circuit for a motor driving a belt conveyor, a plurality of time delay relays arranged in cascade relationship adapted to short out the amount of starting resistance of said motor as said motor is brought up to speed in starting, a pair of relays operable to close a circuit through said motor during starting and normal running thereof, one of said relays being connected in parallel with its associated relay, said pair of relays being adapted to be energized upon energization of said cascade arranged time delay relays, and a switch operable in response to the proper speed of said belt conveyor at the end of the starting cycle thereof for maintaining said pair of relays operable to maintain the circuit through said motor in closed condition.

13. In a motor control circuit for a motor driving a belt conveyor, a plurality of time delay relays arranged in cascade relationship adapted to short out the amount of starting resistance of said motor as said motor is brought up to speed in starting, a pair of relays operable to close a circuit through said motor during starting and normal running thereof, one of said relays being connected in parallel with its associated relay and having a contact in series with its associated relay, said pair of relays being adapted to be energized upon energization of said cascade arranged time delay relays, and a switch operable in response to the proper speed of said belt conveyor at the end of the starting cycle thereof for maintaining said pair of relays operable to maintain the circuit through said motor in closed condition.

14. In a motor control circuit for a motor driving a belt conveyor, a plurality of time delay relays arranged in cascade relationship adapted to short out the amount of starting resistance of said motor as said motor is brought up to speed in starting, a pair of relays operable to close a circuit through said motor during starting and normal running thereof, both of said relays being adapted to be energized after said time delay relays, and a switch operable in response to the proper speed of said belt conveyor at the end of the starting cycle thereof for maintaining both of said relays in energized condition to supply energy to said motor, one of said pair of relays being adapted to prevent repeating of the starting cycle when said belt conveyor has failed to attain proper speed at the end of the starting cycle.

15. In a motor control circuit for a motor driving a belt conveyor, a plurality of time delay relays arranged in cascade relationship adapted to short out the amount of starting resistance of said motor as said motor is brought up to speed in starting, a pair of relays operable to close a circuit through said motor during starting and normal running thereof and adapted to be energized upon energization of said time delay relays, said pair of relays having windings connected in parallel and having contacts in series with said starting resistance, one of said pair of relays being adapted to maintain the other of said pair of relays in energized condition during the starting cycle, and a switch operable in response to the proper speed of said conveyor belt for maintaining the other of said pair of relays in energized condition to continue to supply voltage to said motor when said belt has attained proper speed at the end of the starting cycle.

16. In an electrical control system for controlling the starting cycle of a motor driven inby unit of a conveyor system, a circuit operable in response to the speed of an outby of said conveyor system and in accordance with the load condition of said inby unit and said outby unit, a control relay adapted to be operated upon operation of said circuit, a starter for said motor including means for controlling the amount of starting resistance in circuit with said motor, a circuit including a pair of relays operable to supply voltage to said motor during starting and normal running thereof, both of said relays adapted to be energized after operation of said starter, and a switch operable in response to the speed of said inby unit for maintaining said last-named relays in energized condition to supply voltage to said motor when the motor has attained proper speed at the end of the starting operation, one of said pair of relays being adapted to prevent repeating of the starting cycle when said inby unit has failed to attain proper speed at the end of the starting cycle.

17. In an electrical control system for controlling the starting cycle of a motor driven inby unit of a conveyor system, a circuit operable in response to the speed of an outby conveyor unit adapted to receive the discharge from said inby unit, a circuit for controlling the motor of said inby unit adapted to be energized upon operation of said first named circuit, said second named circuit including a starter therein for controlling the amount of starting resistance in circuit with said motor, a pair of relays adapted to be energized upon the closing of said second named circuit, said last-named relays having windings connected in parallel, and having contacts in series with the resistance of said starter, one of said last-named relays being adapted to maintain the other of said relays in energized condition during the starting cycle, and a switch operable in response to the proper speed of said inby unit for maintaining the other of said relays in energized condition to continue to supply voltage to said motor when the motor has attained proper speed at the end of the starting cycle.

18. In a motor control circuit for a motor driving a belt conveyor, a starter having resistance steps therein adapted to control the amount of starting resistance of said motor as said motor is brought up to speed in starting, a pair of relays operable to close a circuit through said motor during starting and normal running thereof, one of said relays being connected in parallel with its associated relay, said pair of relays being adapted to be energized upon energization of said starter, and a switch operable in response to the proper speed of said belt conveyor at the end of the starting cycle thereof for maintaining said pair of relays operable to maintain the circuit through said motor in closed condition.

ROGER M. BUCKERIDGE.

REFERENCES CITED

The following references are of record in the file of this patent:

UNITED STATES PATENTS

| Number | Name | Date |
|---|---|---|
| 969,583 | White | Sept. 6, 1910 |
| 1,620,532 | Fisher | Mar. 8, 1927 |
| 1,907,089 | Pabst | May 2, 1933 |
| 2,250,141 | Thurston | July 22, 1941 |
| 2,371,956 | Dees | Mar. 20, 1945 |